United States Patent
Rolinski et al.

(10) Patent No.: US 9,834,316 B2
(45) Date of Patent: Dec. 5, 2017

(54) PORTABLE, EXTERNALLY MOUNTED DEVICE FOR AIRCRAFT TO PROVIDE USER SELECTED READINGS OF AIRSPEED, PRESSURE, TEMPERATURE, ORIENTATION, HEADING, ACCELERATION, AND ANGULAR RATE

(71) Applicants: Alexander Rolinski, Eustis, FL (US); Brandon Marsell, Cocoa, FL (US)

(72) Inventors: Alexander Rolinski, Eustis, FL (US); Brandon Marsell, Cocoa, FL (US)

( * ) Notice: Subject to any disclaimer, the term of this patent is extended or adjusted under 35 U.S.C. 154(b) by 0 days.

(21) Appl. No.: 15/617,088

(22) Filed: Jun. 8, 2017

(65) Prior Publication Data

US 2017/0267373 A1    Sep. 21, 2017

Related U.S. Application Data

(63) Continuation-in-part of application No. 15/420,270, filed on Jan. 31, 2017.

(60) Provisional application No. 62/308,271, filed on Mar. 15, 2016.

(51) Int. Cl.

| | | |
|---|---|---|
| B64D 43/00 | (2006.01) | |
| B64D 43/02 | (2006.01) | |
| G01C 23/00 | (2006.01) | |
| G08G 5/00 | (2006.01) | |

(52) U.S. Cl.
CPC ............. B64D 43/02 (2013.01); G01C 23/00 (2013.01); G08G 5/0008 (2013.01)

(58) Field of Classification Search
CPC ...... G01C 23/00; G01C 12/16; G01C 21/165; B64D 43/02; B64D 43/00; G08G 5/0008; B64C 39/024; B64C 13/205; G05D 1/0077; G05D 1/0088
USPC .......................................................... 701/14
See application file for complete search history.

(56) References Cited

U.S. PATENT DOCUMENTS

| | | | | |
|---|---|---|---|---|
| 4,479,070 | A * | 10/1984 | Frische ................. | G01L 9/0022 310/338 |
| 6,076,963 | A * | 6/2000 | Menzies ................. | G01K 13/02 374/135 |
| 7,693,614 | B2 * | 4/2010 | Turung .............. | B64D 45/0015 244/175 |
| 7,881,833 | B2 * | 2/2011 | Turung ................ | G05D 1/0061 701/11 |
| 8,132,117 | B2 * | 3/2012 | Hedrick ................. | B60K 37/02 701/14 |
| 8,229,606 | B2 * | 7/2012 | Vos ...................... | G01C 21/165 244/171 |
| 9,079,060 | B2 * | 7/2015 | Hong .................... | A61B 5/7455 |

(Continued)

OTHER PUBLICATIONS

Eubank et al., Unattended Operation of an Autonomous Seaplane for Persistent Surface and Airborne Ocean Monitoring, 2010, IEEE, p. 1-8.*

(Continued)

*Primary Examiner* — McDieunel Marc
(74) *Attorney, Agent, or Firm* — William Lovin & Associates LLC; William R. Lovin

(57) ABSTRACT

A portable, externally mounted device for aircraft used to provide user selectable readings of airspeed, pressure, temperature, orientation, heading, acceleration, and angular rate is disclosed. The device is self-contained and wireless and is portable from aircraft to aircraft. The device is externally mounted on the aircraft.

17 Claims, 3 Drawing Sheets

(56) References Cited

U.S. PATENT DOCUMENTS

| | | | |
|---|---|---|---|
| 9,387,927 B2* | 7/2016 | Rischmuller | B64C 39/024 |
| 2009/0009363 A1* | 1/2009 | Orf | G01C 25/00 |
| | | | 340/973 |
| 2009/0125164 A1* | 5/2009 | Perrotta | G01C 23/00 |
| | | | 701/3 |
| 2015/0094976 A1* | 4/2015 | Cooper | G01L 27/002 |
| | | | 702/98 |
| 2016/0187882 A1* | 6/2016 | Downey | G05D 1/0055 |
| | | | 701/7 |

OTHER PUBLICATIONS

Lei et al., An Integrated Navigation System for a Small UAV Using Low-Cost Sensors, 2008, IEEE, p. 765-769.*

Kish et al. Wing Bug: a Portable, Low-Cost Flight Test Instrumentation System, 2017, IEEE, p. 1-8.*

Rodriguez et al., Real Time Sensor Acquisition Platform for Experimental UAV Research, 2009, IEEE, p. 5.C.5-1 to 5.C.5-10.*

Mo et al., A Framework of Fine-grained Mobile Sensing Data Collection and Behavior Analysis in an Energy-configurableWay, 2015, IEEE, p. 391-398.*

Madany et al., Robust Navigation Based on Bistatic Radar and Bi-Sensors for Unmanned Air Systems (UASs) Using Integration of Multiple Sensors Fusion Architecture, 2014, IEEE, p. 0670-0673.*

* cited by examiner

PORTABLE, EXTERNALLY MOUNTED DEVICE FOR AIRCRAFT TO PROVIDE USER SELECTED READINGS OF AIRSPEED, PRESSURE, TEMPERATURE, ORIENTATION, HEADING, ACCELERATION, AND ANGULAR RATE

CROSS-REFERENCE TO RELATED APPLICATIONS

This application takes benefit of U.S. patent application Ser. No. 15/420,270 filed Jan. 31, 2017 which itself takes reference to U.S. Prov. App. No. 62/308,271 filed Mar. 15, 2016. This application incorporates these prior applications in their entirety, by reference.

FIELD OF THE INVENTION

The present invention relates to a portable, externally mounted device for aircraft used to provide user selectable readings of airspeed, pressure, temperature, orientation, heading, acceleration, and angular rate. The present invention is self-contained and wireless and is portable from aircraft to aircraft. The present invention is externally mounted on the aircraft.

BACKGROUND OF THE INVENTION

Currently, there is no simple, inexpensive way for aircraft pilots to view and record flight data that includes airspeed, pressure (altimeter), temperature, orientation, heading, acceleration, and angular rate. Current devices for monitoring this data are very complex and expensive. They are hard mounted to the aircraft and permanently wired to one or more screens or instruments mounted in the aircraft to display the readings. Obviously, these devices are not portable and do not interface with portable media devices. Further, not all flying devices have instrumentation. Hang-gliders for example are ordinarily not equipped with instrumentation. Also, not all flying devices have the same type or kind of devices installed. For example, not all flying devices are equipped with instrumentation that captures and records atmospheric temperature.

Therefore, it is a first goal of the present invention to provide a simple and inexpensive way for aircraft pilots to view and record flight data including, but not limited to, airspeed, pressure (altimeter), temperature, orientation, heading, acceleration, and angular rate.

It is a second goal of the present invention to provide a portable device that may be transported from aircraft to aircraft. Such a device will generally not include indicators or displays, but will interoperate with an application on a cellular telephone or tablet computer. Data will be communicated wirelessly between the present invention and the cellular telephone or tablet computer.

Finally, it is a third goal of the present invention to provide a device that presents consistent, equivalent capture and recording of the same flight data no matter what kind of flying machine is used.

SUMMARY OF THE INVENTION

The exemplary embodiment of the present invention comprises two components: 1) A data sensing and collection device with wireless connectivity to a displaying media device such as a cellular telephone or tablet computer; and, 2) An application running on the displaying media device capable of receiving, displaying, and storing the transmitted data.

The data sensing and collection device with wireless connectivity is contained in an aerodynamic housing attached to a mounting stalk. The aerodynamic housing of the data sensing and collection device is generally an elongate ovoid in shape with the leading end being slightly larger than the trailing end. The mounting stalk of the device may be permanently or semi-permanently attached to the aircraft. Ordinarily, the mounting stalk of the device is attached to the aircraft in a location near the leading edge of one of the wings of the flying machine. Similarly, the mounting stalk may be attached to the fuselage or some other surface of the flying machine.

The data sensing and collection device is comprised of the following subsystems: 1) A battery; 2) A pitot tube and associated digital differential pressure sensor; 3) A digital temperature sensor; 4) A digital pressure sensor (altimeter); 5) A gyroscope; 6) An accelerometer; 7) A magnetometer; 8) A processor; and, 9) A wireless transceiver capable of transmitting collected data from the data sensing and collection device to the application running on the displaying media device.

The exemplary embodiment of the data sensing and collection device is configured with the pitot tube oriented parallel to the long axis of the aerodynamic housing and extending forward from the leading end of the device. The data sensing and collection device is aligned such that the pitot tube extends in the direction of flight.

The application is written to operate on a cell telephone or a tablet computer. The cell telephone or tablet computer has a wireless transceiver compatible with the exemplary embodiment of the data sensing and collection device and capable of receiving and transmitting information from and to it. The application has a multiplicity of display windows each capable of displaying information received from the data sensing and collection device. For each type of data transmitted by the data sensing and collection device, the application is capable of displaying at least: 1) The instantaneous current value in a numeric format; and, 2) The instantaneous and historic values in a graphical format. Also, the application is capable of collectively displaying each type of data transmitted by the data sensing and collection device in one window.

The system is used in the following manner: First, the user attaches the stalk of the data sensing and collection device to the wing or other surface of the aircraft before entering the flying machine. Next, the user aligns the data sensing and collection device relative to the stalk such that the long axis of the data sensing and collection device (and particularly the pitot tube) is parallel to the direction of travel of the flying device. Next, the user secures the clamp on the stalk affixing the data sensing and collection device and stalk at their relative locations. Next, the user powers on the data sensing and collection device. Next, the user powers on his cellular telephone or tablet computer. Next, the user activates the application installed on his cellular telephone or tablet computer and establishes communication with the data sensing and collection device. Next, the user selects what data he wishes to see displayed by the application. Next, the user flies the flying machine. Finally, the user observes the data collected by the data sensing and collection device via the application.

DETAILED DESCRIPTION OF THE PREFERRED EMBODIMENT

In the following discussion references are made to a variety of enabling technologies and techniques traditionally used to deploy software-based web services. For example, the term "application" will be used to connote one or more software applications or programs resident on a cellular telephone or tablet computer or computers operating individually or in concert to achieve a certain set of operational features. Without limitation such applications are implemented Apple iOS or Swift or Android Java or LUA. Those having skill in the art however will recognize that numerous other equivalent development environments that may be used.

Similarly, references are made to "cellular telephones" and "tablet computers." Such devices are well known. As above however, those having skill in the art will readily recognize that other equivalent devices are commercially available and readily adapted to the teachings of the present invention.

Figure 1:
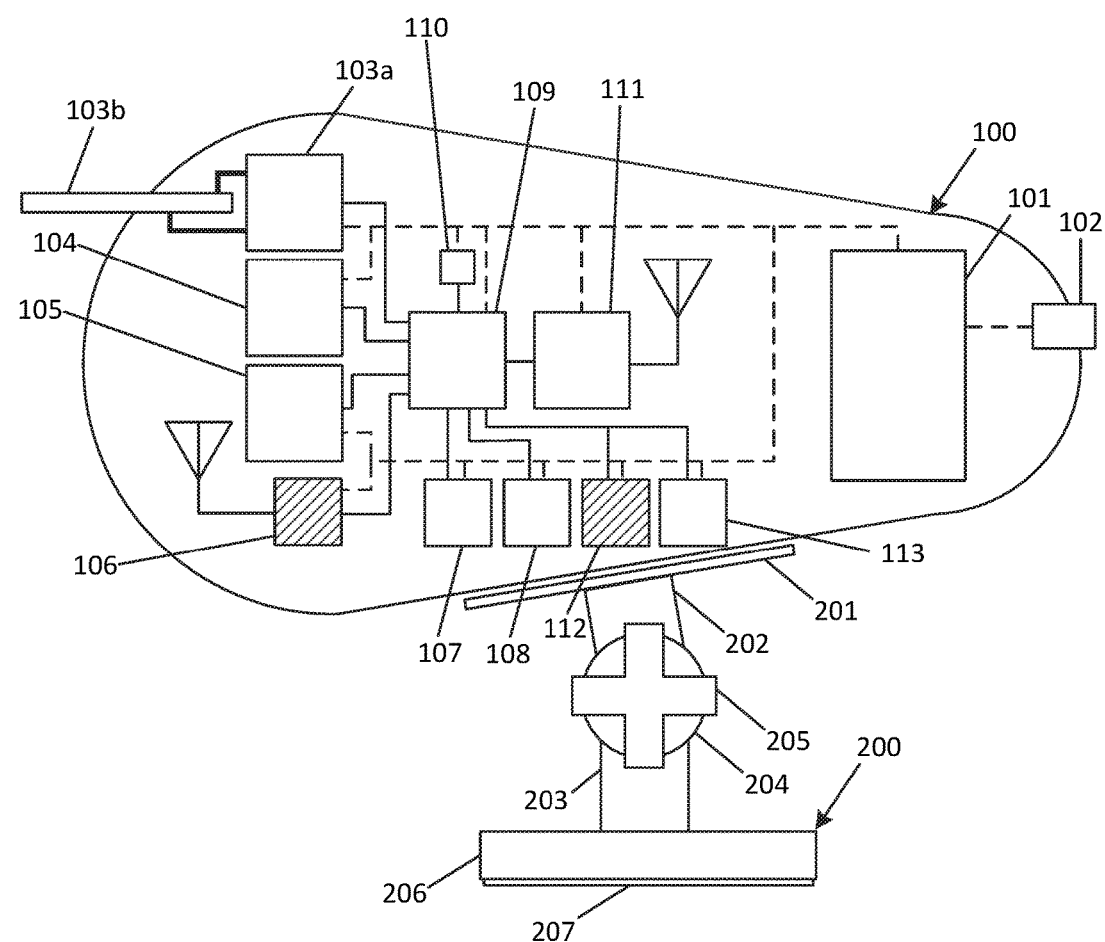
FIG. 1 is a block diagram showing the data sensing and collection device.

Turning now to FIG. 1, an exemplary embodiment of the present invention comprises the following hardware components: 1) A data sensing and collection device 100 (DSCD) for sensing, collecting, and transmitting flight data to a cellular telephone or tablet computer; and, 2) A stalk 200 for adjustably mounting data sensing and collection device 100 to a wing or other exterior surface of a flying machine.

The exemplary embodiment of data sensing and collection device 100 is comprised of the following elements: 1) Battery 101 and a battery charging port 102; 2) Differential pressure sensor 103a and attached pitot tube 103b; 3) Barometric altimeter (pressure sensor) 104; 4) Temperature sensor 105; 5) Gyroscope 107; 6) Accelerometer 108; 7) Magnetometer 113; 8) Microcontroller 109 and storage facility 110; and, 6) Radio transceiver 111.

Battery 101 is used to supply power to the remaining components in data sensing and collection device 100. Battery 101 may be removable or fixed inside data sensing and collection device 100. Battery 101 maybe rechargeable. If battery 101 is rechargeable, then battery charging port 102 is equipped and interconnected to battery 101. Those having skill in the art will recognize that battery 101 may be omitted if data sensing and collection device 100 is wired to the electrical supply system of the flying machine.

Differential pressure sensor 103a is plumbed to pitot tube 103b such that differential pressure sensor 103a can sense the static pressure and total pressure of pitot tube 103b. The difference between these two pressures is the dynamic pressure. Dynamic pressure is related to the frontal pressure seen by the flying machine due to its motion through the air. Thus, the velocity of the flying machine can be calculated from the dynamic pressure. Since pitot tube 103b is exposed to the outside of the flying machine, some level of thermal protection may be appropriate. For example, it may be necessary to supply pitot tube 103b with a heating coil.

Barometric altimeter (pressure sensor) 104 is used to measure the altitude of data sensing and collection device 100. Barometric altimeter (pressure sensor) 104 may be calibrated or not. It is obvious that the higher one flies above the surface of the Earth, the lower the atmospheric pressure recorded by the sensor. It is this barometric measurement that allows the computing of altitude.

Temperature sensor 105 reads the temperature of the air around data sensing and collection device 100.

Gyroscope 107 forms part of a traditional Inertial Measurement Unit (IMU). As such, gyroscope 107 is constructed of three gyroscope monitoring devices aligned such that their axes are orthogonal with respect to one another. Gyroscope 107 provides a stable, three-dimensional reference for data sensing and collection device 100.

Similarly, accelerometer 108 also forms part of a traditional IMU. Accelerometer 108 is constructed of three acceleration monitoring devices aligned such that their axes are orthogonal with respect to one another. Accelerometer 108 provides instantaneous inputs regarding the three dimensional acceleration for data sensing and collection device 100.

Similarly, magnetometer 113 also forms part of a traditional IMU. As such, magnetometer 113 is constructed of three magnetic field monitoring devices aligned such that their axes are orthogonal with respect to one another. Magnetometer 113 provides instantaneous inputs regarding the three dimensional character of the magnetic field in which data sensing and collection device 100 is operating. Magnetometer 113 assists calibration against orientation drift.

Microcontroller 109 and storage facility 110 perform all computational tasks for data sensing and collection device 100. Microcontroller 109 is ordinarily an ARM processing system, but those having skill in the art will recognize that there are numerous equivalent alternatives. Storage facility 110 combines some amount of random access memory and read only memory. In one embodiment of the present invention microcontroller 109 and storage facility 110 may be implemented on the same physical device. Ordinarily, storage facility 110 contains instructions implementing the operating program that controls and operates data sensing and collection device 100.

Radio transceiver 111 is used to communicate with an attached cell telephone or tablet computer and ordinarily supports the Bluetooth protocol. Those having skill in the art will readily recognize that there are numerous other protocols that may be used including Wi-Fi.

This basic collection of devices is sufficient to calculate airspeed, pressure (altitude), temperature, orientation, heading, acceleration, and angular rate. However, those having skill in the art will readily recognize that there are numerous other devices that may be added to data sensing and collection device 100. For example, an alternative embodiment of data sensing and collection device 100 has GPS receiver 106. Similarly, an alternative embodiment of data sensing and collection device 100 may be equipped with digital compass 112.

All of these devices are powered by battery 101 and attached to microcontroller 109 and storage device 110.

The exemplary embodiment of stalk 200 includes a mounting head 201 designed to affix to data sensing and collection device 100. Mounting head 201 is permanently affixed to distal shaft 202. Proximal shaft 203 is attached to mounting base 206. Mounting base 206 is equipped with adhesive pad 207 on its bottom side. Adhesive pad 207 is a double sided adhesive pad. One side is attached to the bottom of mounting base 206 while the other side is affixed to the exterior surface of the flying machine. Distal shaft 202 is affixed to mounting clamp 204. Mounting clamp 204 is friction adjustable by mounting clamp bolt 205. In use mounting clamp 204 affixes over a mating hole in proximal shaft 203. The user then tightens mounting clamp bolt 205 down securing distal shaft 202 and proximal shaft 203 together. Ordinarily, the user adjusts data sensing and collection device 100 such that pitot tube 103b proceeds in the direction of flight of the flying machine.

It will be obvious to those having skill in the art that the disclosed design of stalk 200 and attached data sensing and collection device 100 is adjustable in only one axis. It will be obvious to those having skill in the art that stalk 200 may be equipped with more than one mounting clamp 204 and that such mounting clamps may be aligned 90° with respect to one another. By this means stalk 200 and attached data sensing and collection device 100 may be aligned in two axes. Obviously, stalk 200 may be equipped with more than one mounting clamp 204 aligned at an angle other than 90°.

Data sensing and collection device 100 provides data to a software application operating on a cellular telephone or tablet computer. The application displays and/or records the data for later use. The software application has two basic functions: 1) Initializing the data communication link between data sensing and collection device 100 and the application; and, 2) Recording and displaying the data collected from an attached data sensing and collection device 100.

Figure 2:
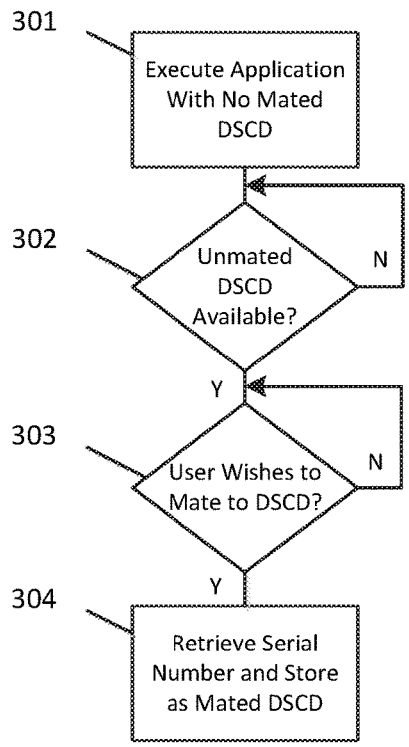
FIG. 2 is a flow diagram illustrating the process of linking to the data sensing and collection device using the application.

Turning now to FIG. 1 and FIG. 2, the process undertaken by the software application initializing the data communication link between data sensing and collection device 100 and the application is shown. First, the user downloads and executes the software application with no mated DSCD (301). Ordinarily, this would occur when the user first installs the software application on a cellular telephone or tablet computer. Next, the software application queries the surrounding area to determine if there are any unmated DSCDs present (302). If the software application does not locate any unmated DSCDs, the software application repeats this step. If the software application locates an unmated DSCD, the software application queries the user to determine if the user wishes to mate with the identified DSCD (303). If the user does not wish to mate with the identified unmated DSCD, the software application repeats this step. If the user does wish to mate with the identified unmated DSCD, the software application retrieves and stores the selected DSCD's serial number (304). From this point forward the software application installed on the user's cellular telephone or tablet computer attempts to connect to and collect information from the DSCD with the serial number collected during the mating process.

Figure 3:
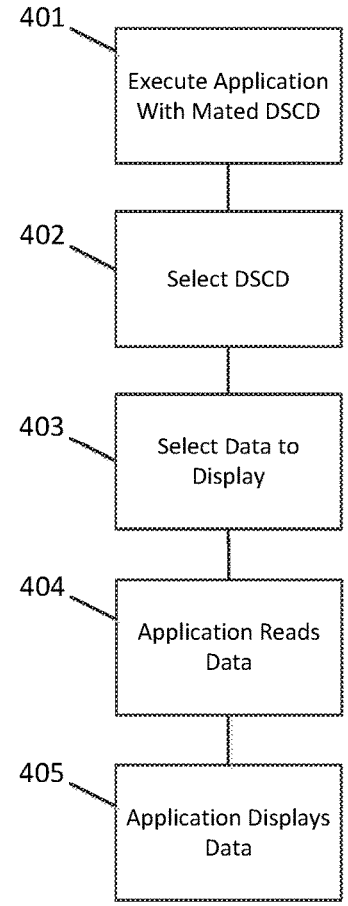
FIG. 3 is a flow diagram illustrating the process of using the application to display information derived from the data sensing and collection device.

Turning now to FIG. 1 and FIG. 3, the process undertaken by the software application after it has been mated to a data sensing and collection device 100 is shown. First, the user executes the software application with a mated DSCD nearby (401). Next, the software application queries the user to select a mated DSCD to interrogate (402). This step will be performed only if the user has more than one DSCD mated with the software application. Next, the software application requests that the user select the data to be displayed (403). This step is used to determine which of the multiplicity of types of data provided by the DSCD are actually displayed by the application software. For example, the user may wish to see altitude data displayed. Or, alternately, the user may wish to see altitude data and speed data displayed simultaneously. Or, alternately, the user may wish to see altitude data and speed data displayed graphically so that an arbitrary history of data may be viewed. Or, alternately, the user may wish to see a simulated, graphical representation of gauges such as an airspeed indicator, an altimeter, a thermometer, an attitude indicator, a vertical speed indicator, a heading indicator, or, a turn coordinator. Next, the software application reads the data the user has selected for display (404). Finally, the software application displays the data the user has selected on the display (405).

Referring again to FIG. 1, the system is used in the following manner: First, the user attaches stalk 200 affixed to data sensing and collection device 100 to the wing or other surface of the flying machine. Ordinarily, this is done by removing a paper covering over an adhesive layer on adhesive pad 207 on the bottom of mounting base 206. It will be obvious to those having skill in the art that other means of affixing mounting base 206 to an external aircraft surface are readily conceivable. Next, the user aligns data sensing and collection device 100 relative to stalk 200 such that the long axis of the data sensing and collection device 100 (and particularly the long axis of pitot tube 103b) is parallel to the direction of travel of the flying machine. Next, the user secures mounting clamp 204 by tightening mounting clamp bolt 205 on stalk 200 thus affixing data sensing and collection device 100 and stalk 200 at their relative locations. Next, the user powers on data sensing and collection device 100. The user performs these steps before entering the flying machine. Next, the user powers on his cellular telephone or tablet computer. Next, the user activates the software application installed on his cellular telephone or tablet computer and establishes communication with data sensing and collection device 100. Next, the user selects what data and how he wishes to see it displayed by the software application. Next, the user flies the flying machine. Finally, the user observes the data collected by data sensing and collection device 100 via the software application.

Figure 4:
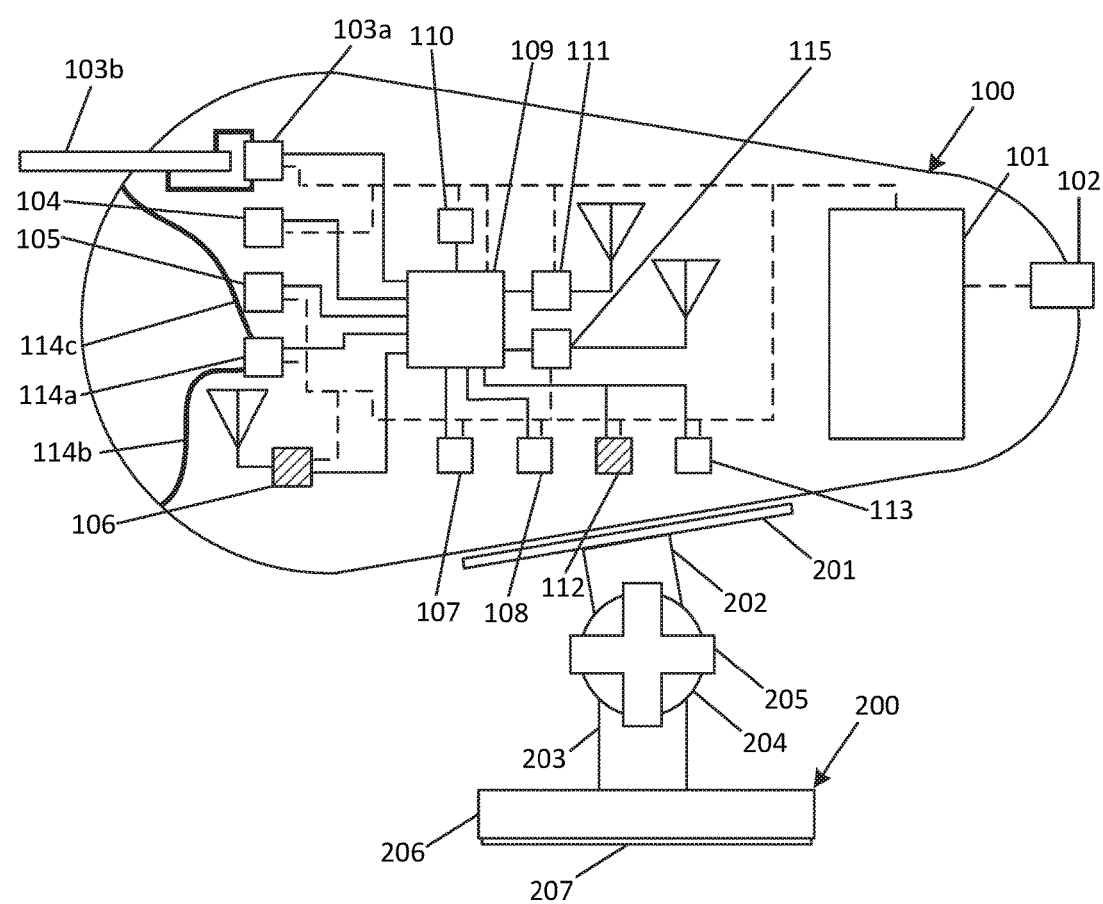
FIG. 4 is a block diagram showing an alternative implementation of the data sensing and collection device.

Turning now to FIG. 4, an alternative embodiment of the present invention is illustrated. This alternative embodiment is generally identical to the exemplary embodiment presented in FIG. 1 and is again comprised of: 1) A data sensing and collection device 100 (DSCD) for sensing, collecting, and transmitting flight data to a cellular telephone or tablet computer; and, 2) A stalk 200 for adjustably mounting data sensing and collection device 100 to a wing or other exterior surface of a flying machine.

The alternative embodiment of data sensing and collection device 100 is again comprised of the following elements: 1) Battery 101 and a battery charging port 102; 2) Differential pressure sensor 103a and attached pitot tube 103b; 3) Barometric altimeter (pressure sensor) 104; 4) Temperature sensor 105; 5) Gyroscope 107; 6) Accelerometer 108; 7) Magnetometer 113; 8) Microcontroller 109 and storage facility 110; and, 6) Radio transceiver 111.

Battery 101 is used to supply power to the remaining components in data sensing and collection device 100. Battery 101 may be removable or fixed inside data sensing and collection device 100. Battery 101 maybe rechargeable. If battery 101 is rechargeable, then battery charging port 102 is equipped and interconnected to battery 101. Those having skill in the art will recognize that battery 101 may be omitted if data sensing and collection device 100 is wired to the electrical supply system of the flying machine.

Differential pressure sensor 103a is again plumbed to pitot tube 103b such that differential pressure sensor 103a can sense the static pressure and total pressure of pitot tube 103b. The difference between these two pressures is the dynamic pressure. Dynamic pressure is related to the frontal pressure seen by the flying machine due to its motion through the air. Thus, the velocity of the flying machine can be calculated from the dynamic pressure. Since pitot tube 103b is exposed to the outside of the flying machine, some level of thermal protection may be appropriate. For example, it may be necessary to supply pitot tube 103b with a heating coil.

Barometric altimeter (pressure sensor) 104 is used to measure the altitude of data sensing and collection device 100. Barometric altimeter (pressure sensor) 104 may be calibrated or not. It is obvious that the higher one flies above the surface of the Earth, the lower the atmospheric pressure recorded by the sensor. It is this barometric measurement that allows the computing of altitude.

Temperature sensor 105 reads the temperature of the air around data sensing and collection device 100.

Gyroscope 107 forms part of a traditional Inertial Measurement Unit (IMU). As such, gyroscope 107 is constructed of three gyroscope monitoring devices aligned such that their axes are orthogonal with respect to one another. Gyroscope 107 provides a stable, three-dimensional reference for data sensing and collection device 100.

Similarly, accelerometer 108 also forms part of a traditional IMU. Accelerometer 108 is constructed of three acceleration monitoring devices aligned such that their axes are orthogonal with respect to one another. Accelerometer 108 provides instantaneous inputs regarding the three dimensional acceleration for data sensing and collection device 100.

Similarly, magnetometer 113 also forms part of a traditional IMU. As such, magnetometer 113 is constructed of three magnetic field monitoring devices aligned such that their axes are orthogonal with respect to one another. Magnetometer 113 provides instantaneous inputs regarding the three dimensional character of the magnetic field in which data sensing and collection device 100 is operating. Magnetometer 113 assists calibration against orientation drift.

Microcontroller 109 and storage facility 110 perform all computational tasks for data sensing and collection device 100. Microcontroller 109 is ordinarily an ARM processing system, but those having skill in the art will recognize that there are numerous equivalent alternatives. Storage facility 110 combines some amount of random access memory and read only memory. In one embodiment of the present invention microcontroller 109 and storage facility 110 may be implemented on the same physical device. Ordinarily, storage facility 110 contains instructions implementing the operating program that controls and operates data sensing and collection device 100.

Radio transceiver 111 is used to communicate with an attached cell telephone or tablet computer and ordinarily supports the Bluetooth protocol. Those having skill in the art will readily recognize that there are numerous other protocols that may be used including Wi-Fi.

This basic collection of devices is again sufficient to calculate airspeed, pressure (altitude), temperature, orientation, heading, acceleration, and angular rate. However, those having skill in the art will readily recognize that there are numerous other devices that may be added to data sensing and collection device 100. For example, an alternative embodiment of data sensing and collection device 100 has GPS receiver 106. Similarly, an alternative embodiment of data sensing and collection device 100 may be equipped with digital compass 112.

By the same token, yet another alternative embodiment of data sensing and collection device 100 may be equipped with a second alternative, differential pressure sensor 114a with two atmospheric tubes and inputs 114b and 114c. Atmospheric inputs 114b and 114c are installed leading from the external aspect of the case of data sensing and collection device 100 such that when viewed in a plane that transects both of them simultaneously they lie at a generally 90° angle with respect to one another. Variants that place atmospheric inputs 114b and 114c outboard of pitot tube 103b are generally preferred. Second alternative, differential pressure sensor 114a when fed by atmospheric inputs 114b and 114c is used to calculate angle of attack.

By the same token, yet another alternative embodiment of data sensing and collection device 100 may be equipped with an Automatic Dependent Surveillance-Broadcast (ADS-B) Out transmitter allowing the device to broadcast its derived position to air traffic controllers and other aircraft. This third alternative system broadcasts aircraft identification, position, altitude, and velocity through the ADS-B Out transmitter. ADS-B Out provides air traffic controllers with real-time position information that is, in most cases, more accurate than the information available with current radar-based systems.

By the same token, yet another alternative embodiment of data sensing and collection device 100 may be equipped with an Automatic Dependent Surveillance-Broadcast (ADS-B) Out/In transmitter/receiver allowing the device to both broadcast its derived position to air traffic controllers and other aircraft while simultaneously receiving data from air traffic controllers and other aircraft.

All of these devices are powered by battery 101 and attached to microcontroller 109 and storage device 110.

The alternative embodiment of stalk 200 includes a mounting head 201 designed to affix to data sensing and collection device 100. Mounting head 201 is permanently affixed to distal shaft 202. Proximal shaft 203 is attached to mounting base 206. Mounting base 206 is equipped with adhesive pad 207 on its bottom side. Adhesive pad 207 is a double sided adhesive pad. One side is attached to the bottom of mounting base 206 while the other side is affixed to the exterior surface of the flying machine. Distal shaft 202 is affixed to mounting clamp 204. Mounting clamp 204 is friction adjustable by mounting clamp bolt 205. In use mounting clamp 204 affixes over a mating hole in proximal shaft 203. The user then tightens mounting clamp bolt 205 down securing distal shaft 202 and proximal shaft 203 together. Ordinarily, the user adjusts data sensing and collection device 100 such that pitot tube 103b proceeds in the direction of flight of the flying machine.

It will be obvious to those having skill in the art that the disclosed design of stalk 200 and attached data sensing and collection device 100 is adjustable in only one axis. It will be obvious to those having skill in the art that stalk 200 may be equipped with more than one mounting clamp 204 and that such mounting clamps may be aligned 90° with respect to one another. By this means stalk 200 and attached data sensing and collection device 100 may be aligned in two axes. Obviously, stalk 200 may be equipped with more than one mounting clamp 204 aligned at an angle other than 90°.

While the present invention has been described in what are thought to be the most useful and practical embodiments, it will be readily apparent to those having skill in the art that other variations may be readily conceived and created. Accordingly, these and all such other readily conceived and created variations are implicitly included in the spirit and scope of the present disclosure.

What is claimed is:

1. A data sensing and collection device comprising:
   a) an aerodynamically configured housing mounted to a stalk adjustable in at least one axis wherein the stalk is adhesively affixed to an exterior aspect of a flying machine and the housing is not attached to the exterior aspect of the flying machine;

b) wherein said housing contains an electronic device comprising:
   a) a battery;
   b) a differential pressure sensor and attached pitot tube;
   c) a barometric altimeter (pressure sensor);
   d) a temperature sensor;
   e) a gyroscope;
   f) an accelerometer;
   g) a magnetometer;
   h) a microcontroller and storage facility; and
   i) a radio transceiver.

2. A data sensing and collection device of claim 1 wherein said battery is rechargeable and further comprises a battery recharging port.

3. A data sensing and collection device of claim 1 wherein said radio transceiver supports the Bluetooth transmission protocol.

4. A data sensing and collection device of claim 1 wherein said radio transceiver supports the Wi-Fi transmission protocol.

5. A data sensing and collection device of claim 1 further comprising a GPS receiver.

6. A data sensing and collection device of claim 1 further comprising a digital compass.

7. A method of monitoring flight data comprising the steps of:
   a) affixing the stalk attached to a data sensing and collection device to the exterior surface of a flying machine;
   b) aligning the stalk such that the pitot tube extending from the data sensing and collection device is aligned parallel to the direction of flight;
   c) activating a software application running on a cellular telephone or tablet computer; and
   d) selecting the type of data to be collected from the data sensing and collection device and displayed on the cellular telephone or tablet computer.

8. A method of monitoring flight data of claim 7 wherein said data comprises airspeed.

9. A method of monitoring flight data of claim 7 wherein said data comprises altitude.

10. A method of monitoring flight data of claim 7 wherein said data comprises temperature.

11. A method of monitoring flight data of claim 7 wherein said data comprises orientation.

12. A method of monitoring flight data of claim 7 wherein said data comprises heading.

13. A method of monitoring flight data of claim 7 wherein said data comprises acceleration.

14. A method of monitoring flight data of claim 7 wherein said data comprises angular rate.

15. A data sensing and collection device of claim 1 further comprising a second differential pressure sensor with two atmospherically connected input tubes terminating outside the housing.

16. A data sensing and collection device of claim 1 further comprising an Automatic Dependent Surveillance-Broadcast (ADS-B) receiver.

17. A data sensing and collection device of claim 1 further comprising an Automatic Dependent Surveillance-Broadcast (ADS-B) transmitter.

* * * * *

US009834316C1

(12) EX PARTE REEXAMINATION CERTIFICATE (12051st)
United States Patent
Rolinski et al.

(10) Number: US 9,834,316 C1
(45) Certificate Issued: May 10, 2022

(54) PORTABLE, EXTERNALLY MOUNTED DEVICE FOR AIRCRAFT TO PROVIDE USER SELECTED READINGS OF AIRSPEED, PRESSURE, TEMPERATURE, ORIENTATION, HEADING, ACCELERATION, AND ANGULAR RATE

(71) Applicants: Alexander Rolinski, Eustis, FL (US); Brandon Marsell, Cocoa, FL (US)

(72) Inventors: Alexander Rolinski, Eustis, FL (US); Brandon Marsell, Cocoa, FL (US)

Reexamination Request:
No. 90/014,307, Jun. 11, 2019

Reexamination Certificate for:
Patent No.: 9,834,316
Issued: Dec. 5, 2017
Appl. No.: 15/617,088
Filed: Jun. 8, 2017

Related U.S. Application Data

(63) Continuation-in-part of application No. 15/420,270, filed on Jan. 31, 2017, now abandoned.

(60) Provisional application No. 62/308,271, filed on Mar. 15, 2016.

(51) Int. Cl.
*B64D 43/00* (2006.01)
*B64D 43/02* (2006.01)
*G01C 23/00* (2006.01)
*G08G 5/00* (2006.01)

(52) U.S. Cl.
CPC ............. *B64D 43/02* (2013.01); *G01C 23/00* (2013.01); *G08G 5/0008* (2013.01)

(58) Field of Classification Search
None
See application file for complete search history.

(56) References Cited

To view the complete listing of prior art documents cited during the proceeding for Reexamination Control Number 90/014,307, please refer to the USPTO's public Patent Application Information Retrieval (PAIR) system under the Display References tab.

*Primary Examiner* — Karin Reichle

(57) ABSTRACT

A portable, externally mounted device for aircraft used to provide user selectable readings of airspeed, pressure, temperature, orientation, heading, acceleration, and angular rate is disclosed. The device is self-contained and wireless and is portable from aircraft to aircraft. The device is externally mounted on the aircraft.

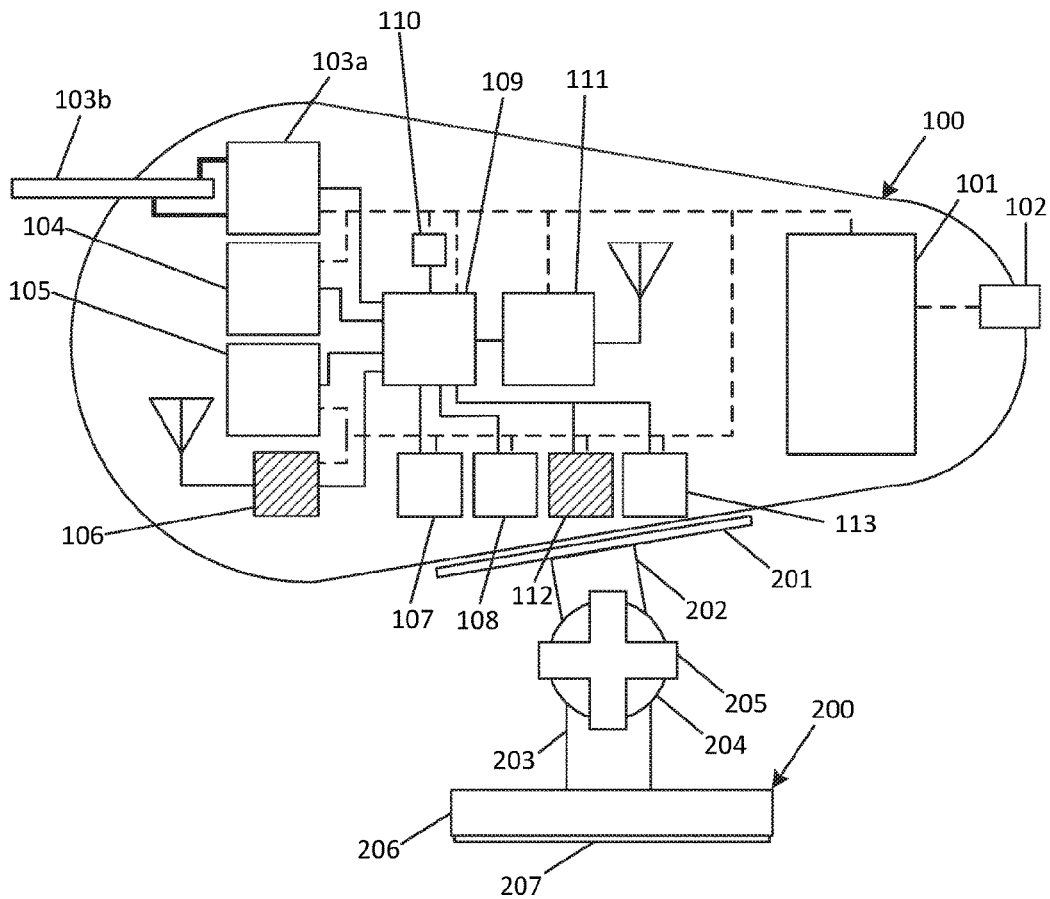

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-17 are cancelled.

\* \* \* \* \*